(12) United States Patent
Liu

(10) Patent No.: US 9,935,811 B2
(45) Date of Patent: Apr. 3, 2018

(54) METHOD, WEB SERVER AND SYSTEM FOR REMOTE CONTROL

(71) Applicant: TENCENT TECHNOLOGY (SHENZHEN) COMPANY LIMITED, Guangdong (CN)

(72) Inventor: Zhao Liu, Guangdong (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 448 days.

(21) Appl. No.: 14/607,698

(22) Filed: Jan. 28, 2015

(65) Prior Publication Data

US 2015/0156055 A1     Jun. 4, 2015

Related U.S. Application Data

(63) Continuation of application No. PCT/CN2013/080387, filed on Jul. 30, 2013.

(30) Foreign Application Priority Data

Aug. 1, 2012    (CN) .......................... 2012 1 0271326

(51) Int. Cl.
    *H04L 29/08*    (2006.01)
(52) U.S. Cl.
    CPC ............ *H04L 29/08* (2013.01); *H04L 67/025* (2013.01); *H04L 67/125* (2013.01)
(58) Field of Classification Search
    CPC ..................................................... H04L 29/08
    (Continued)

(56) References Cited

U.S. PATENT DOCUMENTS

| 6,938,101 | B2 * | 8/2005 | Hayes ................... G06F 1/1626 |
| | | | 348/E5.103 |
| 8,155,636 | B2 * | 4/2012 | Cheng ............... H04M 1/72533 |
| | | | 370/261 |
| 2004/0122908 | A1 | 6/2004 | Konopka et al. |

FOREIGN PATENT DOCUMENTS

| CN | 1829153 A | 9/2006 |
| CN | 101540095 A | 9/2009 |

(Continued)

OTHER PUBLICATIONS

International Search Report corresponding to PCT application PCT/CN2013/080387 filed Jul. 30, 2013.

(Continued)

*Primary Examiner* — Adnan Mirza
(74) *Attorney, Agent, or Firm* — Anova Law Group, PLLC

(57) ABSTRACT

The present invention relates to remote control technologies, and provides a method, web server and system for remote control. The method comprises: receiving remote control information sent by a remote-controlling terminal; executing a control instruction on a corresponding webpage in accordance with the remote control information, or sending information on the corresponding webpage back to the remote-controlling terminal and executing a control instruction selected or entered by a user at the remote-controlling terminal based on information on the corresponding webpage; and returning execution result to the remote-controlling terminal in a webpage format so that the remote-controlling terminal can obtain information on current execution result at a remote-controlled terminal based on the returned webpage. The present invention can effectively address the issues of poor usability caused by the need to develop different remote control software for different platforms, and that remote-controlling terminal cannot receive (Continued)

and display execution result of the remote control instruction.

20 Claims, 2 Drawing Sheets

(58) Field of Classification Search
USPC .......................................................... 709/223
See application file for complete search history.

(56) References Cited

FOREIGN PATENT DOCUMENTS

| CN | 101789964 A | 7/2010 |
| CN | 102447720 A | 5/2012 |

OTHER PUBLICATIONS

The State Intellectual Property Office of the People's Republic of China (SIPO) Office Action 1 for 201210271326.9 Sep. 5, 2017 9 Pages (including translation).

* cited by examiner

METHOD, WEB SERVER AND SYSTEM FOR REMOTE CONTROL

CROSS-REFERENCE TO RELATED APPLICATIONS

This application is a continuation of International Patent Application No. PCT/CN2013/080387, entitled "Method, Web Server and System for Remote Control," filed on Jul. 30, 2013. This application claims the benefit and priority of Chinese Patent Application No. 201210271326.9, entitled "Method, Web Server and System for Remote Control," filed on Aug. 1, 2012. The entire disclosures of each of the above applications are incorporated herein by reference.

TECHNICAL FIELD

The present invention relates to remote control technologies, and more particularly to a method, web server and system for remote control.

BACKGROUND

A remote control system generally includes a remote-controlling terminal and a remote-controlled terminal. The remote-controlling terminal sends a remote control instruction to the remote-controlled terminal. After receiving the remote control instruction, the remote-controlled terminal executes the corresponding operations.

In existing remote control systems, remote control software needs to be installed both on the remote-controlling terminal and the remote-controlled terminal. Due to the platform diversity of intelligent devices, different remote control software needs to be developed for different platforms, which causes poor usability. Furthermore, existing remote-controlling terminal generally can only send remote control instructions, but cannot receive and display execution result of the remote control instruction.

SUMMARY OF THE INVENTION

The embodiments of the present invention provide a method, web server and system for remote control, and can effectively address the issues of poor usability caused by the need to develop different remote control software for different platforms, and that remote-controlling terminal cannot receive and display execution result of the remote control instruction.

In accordance with an embodiment of the present invention, a method for remote control is provided for use in a remote-controlled terminal. The method comprises: receiving remote control information sent by a remote-controlling terminal; executing a control instruction on a corresponding webpage in accordance with the remote control information, or sending information on the corresponding webpage back to the remote-controlling terminal and executing a control instruction selected or entered by a user at the remote-controlling terminal based on information on the corresponding webpage; and returning execution result to the remote-controlling terminal in a webpage format.

In accordance with another embodiment of the present invention, a web server is provided for use in a remote-controlled terminal. The web server comprises: an information reception unit for receiving remote control information sent by a remote-controlling terminal; a control unit for executing a control instruction on a corresponding webpage in accordance with the remote control information, or sending information on the corresponding webpage back to the remote-controlling terminal and executing a control instruction selected or entered by a user at the remote-controlling terminal based on information on the corresponding webpage; and returning execution result to the remote-controlling terminal in a webpage format.

In accordance with another embodiment of the present invention, a system for remote control is provided, the system comprising a remote-controlling terminal and a remote-controlled terminal, wherein the remote-controlling terminal is connected to the remote-controlled terminal through a network, the remote-controlled terminal comprises a web server, and remote-controlled terminal is configured to receive remote control information sent by a remote-controlling terminal through the web server and be remotely controlled through the remote control information.

The embodiment of the present invention has the following advantages compared to the prior art: the remote-controlling terminal interacts with the remote-controlled terminal through webpages, and controls the remote-controlled terminal through the execution of control instruction on webpages, thus avoiding the issue of poor usability caused by the platform diversity of intelligent devices and the need to develop different remote control software for different platforms. Furthermore, the execution result can be returned to the remote-controlling terminal in a webpage format so that, after sending the remote control instruction, the remote-controlling terminal can obtain information on current execution result at a remote-controlled terminal based on the returned webpage, thus avoiding the issue of the remote-controlled terminal executing a control instruction not related to the remote control instruction sent by the remote-controlling terminal.

BRIEF DESCRIPTION OF THE DRAWINGS

To better illustrate the technical features of the embodiments of the present invention, various embodiments of the present invention will be briefly described in conjunction with the accompanying drawings. It is obvious that the draws are but for exemplary embodiments of the present invention, and that a person of ordinary skill in the art may derive additional draws without deviating from the principles of the present invention.

DESCRIPTION OF THE PREFERRED EMBODIMENTS

To better illustrate the purpose, technical feature, and advantages of the embodiments of the present invention, various embodiments of the present invention will be further described in conjunction with the accompanying drawings. It should be noted that the various embodiments of the present invention are merely exemplary embodiments for illustrating the present invention, and are not intended to limit the scope of the present invention.

The technical features of the present invention will be described in conjunction with the various embodiments of the present invention.

Embodiment One

Figure 1:
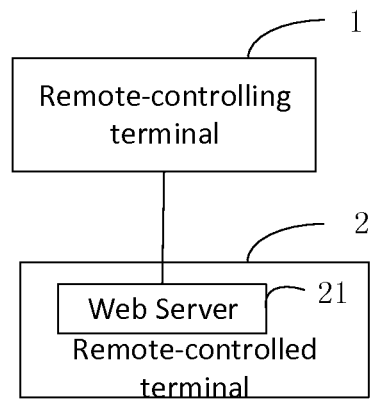
FIG. 1 is a schematic diagram for a remote control system in accordance with a first embodiment of the present invention.

FIG. 1 is a schematic diagram for a remote control system in accordance with a first embodiment of the present invention. The method for remote control in accordance with embodiments of the present invention can be used in this remote control system. For illustrative purposes, only the components relevant to this embodiment are shown.

As shown in FIG. 1, the remote control system includes remote-controlling terminal 1 and remote-controlling terminal 2. The remote-controlling terminal 1 and remote-controlling terminal 2 communicate over a network connection.

The remote-controlling terminal 1 and remote-controlling terminal 2 can be terminal devices with a wired or wireless network connection, including but not limited to mobile phones, tablets, laptops, and so on.

Preferably, the remote-controlling terminal 2 includes a web server 21.

In accordance with this embodiment, the remote-controlled terminal 2 receives remote control information sent by the remote-controlling terminal 1 through web server 21. For example, the remote-controlled terminal 2 receives remote control information sent by a browser or other similar applications on the remote-controlling terminal 1 through web server 21. The remote-controlled terminal 2 executes the control instruction on a corresponding webpage in accordance with the remote control information, or sends information on the corresponding webpage back to the remote-controlling terminal 1, executes a control instruction selected or entered by a user at the remote-controlling terminal 1 based on information on the corresponding webpage, and returns execution result to the remote-controlling terminal 1 in a webpage format.

The remote control information is used to instruct the web server 21 in the remote-controlled terminal 2 to either send information on the corresponding webpage back to the remote-controlling terminal 1, or execute the control instruction on the corresponding webpage.

Preferably, the remote control information includes a Uniform/Universal Resource Locator (URL).

Preferably, the web server 21 includes information on several control pages, and each control page includes at least one control instruction. If the webpage corresponding to the URL in the control information is a control page, the control instruction at the control page is executed, and the execution result is returned to the remote-controlling terminal in a webpage format.

Preferably, the web server 21 includes information on a main page, and the main page includes links to several control pages. If the webpage corresponding to the URL in the remote control information is a main page, information on the main page is returned to the remote-controlling terminal 1; a link to a control page selected by a user at the remote-controlling terminal 1 is returned; the control instruction at the control page is executed, and the execution result is returned to the remote-controlling terminal 1 in a webpage format.

Preferably, the web server 21 includes information on a main page, and the main page includes a control instruction input box. If the webpage corresponding to the URL in the remote control information is a main page, information on the main page is returned to the remote-controlling terminal 1; a control instruction entered in the control instruction input box by a user at the remote-controlling terminal 1 is received, a corresponding control page is generated based on the control instruction, the control instruction is executed, and the execution result is returned to the remote-controlling terminal in a webpage format.

In accordance with this embodiment, the control instruction includes but is not limited to PPT Page Up, PPT Page Down, Monitor On, Monitor Off, Player Volume Control, or Player Playing a designated file.

For example, in the process discussed above, the remote-controlling terminal, such as a smartphone, sends remote control information to the remote-controlled terminal, such as a personal computer, through a browser, i.e., the remote-controlling terminal receives a URL entered at the browser by a user at the remote-controlling terminal, and sends remote control information including the URL to the remote-controlled terminal. The URL can be the URL of the main page for the web server in the remote-controlled terminal, or the URL of a control page in the web server. After receiving the remote control information including the URL, the remote-controlled terminal determines whether the corresponding webpage is a main page or a control page based on the URL. If the corresponding webpage is a control page, the control instruction, such as PPT Page Up, at the control page is executed, and the execution result is returned to the remote-controlling terminal in a webpage format. If the corresponding webpage is a main page, information on the main page is returned to the remote-controlling terminal; a link to a control page selected by a user at the remote-controlling terminal is returned; the control instruction at the control page is executed, and the execution result is returned to the remote-controlling terminal in a webpage format. Alternative, if the corresponding webpage is a main page, a control instruction entered in the control instruction input box by a user at the remote-controlling terminal is received, a corresponding control page is generated based on the control instruction, the control instruction is executed, and the execution result is returned to the remote-controlling terminal in a webpage format.

As discussed above, in accordance with this embodiment, the remote-controlling terminal can remotely control the remote-controlled terminal by visiting the web server. Unlike the prior art, no remote control software needs to be separately installed on the remote-controlling terminal and the remote-controlled terminal in accordance with this embodiment, thus avoiding the issue of poor usability caused by the platform diversity of intelligent devices and the need to develop different remote control software for different platforms. Furthermore, the remote-controlling terminal can select or enter corresponding control instruction based on the needs during the interactive remote control operation, which enhances interactivity and scalability, and avoids poor scalability in existing custom-made remote controlling terminals (such as PPT remote control pen) that can only implement manufacturer-configured remote control functions (for example, PPT remote control pan can only implement the functions of PPT Page Up or PPT Page Down).

Embodiment Two

Figure 2:
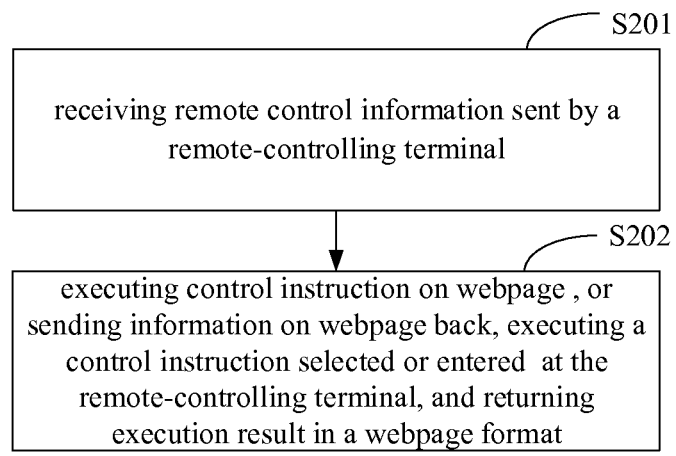
FIG. 2 is an exemplary flowchart for a method for remote control in accordance with a second embodiment of the present invention.

FIG. 2 is an exemplary flowchart for a method for remote control in accordance with a second embodiment of the present invention. The method for remote control in accordance with this embodiment can be implemented in the web server 21 in FIG. 1. As shown in FIG. 2, the method includes:

Step 201: receiving remote control information sent by a remote-controlling terminal.

In accordance with this embodiment, the remote control information is used to instruct the web server 21 in the remote-controlled terminal 2 to either send information on the corresponding webpage (such as a main page) back to the remote-controlling terminal 1, or execute the control instruction on the corresponding webpage (such as a control page). The remote control information can be sent by a browser or other similar applications on the remote-controlling terminal 1.

It should be noted that the web server 21 can include information on several control pages, and each control page includes at least one control instruction. The web server 21 can also include information on a main page, and the main page includes links to several control pages or a control instruction input box.

Step 202: executing a control instruction on a corresponding webpage in accordance with the remote control information, or sending information on the corresponding webpage back to the remote-controlling terminal and executing a control instruction selected or entered by a user at the remote-controlling terminal based on information on the corresponding webpage; and returning execution result to the remote-controlling terminal in a webpage format.

In accordance with this embodiment, the remote control information can also include control instruction or other similar information so that after the web server receives such information, it can control the remote-controlled terminal. Information on the corresponding webpage returned to the remote-controlling terminal can be information on a main page including links to several control pages or a control instruction input box. The control instruction can include but is not limited to PPT Page Up, PPT Page Down, Monitor On, Monitor Off, Player Volume Control, or Player Playing a designated file.

Furthermore, to enhance the security of the remote control and avoid being controlled by illegal remote-controlling terminals, the remote control information can further include authentication information, so that after receiving the remote control information from a remote controlling terminal, the web server can determine whether the remote-controlling terminal is a legitimate remote-controlling terminal, and if so, execute the appropriate control instruction.

In accordance with a preferred embodiment of the present invention, after the execution of the control instruction, the execution result is used to generate a webpage, and the webpage is returned to the remote-controlling terminal, so that the remote-controlling terminal can obtain information on current execution result at a remote-controlled terminal based on the returned webpage, thus avoiding the issue of the remote-controlled terminal executing a control instruction not related to the remote control instruction sent by the remote-controlling terminal. For example, after executing a PPT Page UP or PPT Page Down instruction, the content and the notes on the current page on the remote-controlled terminal are used to generate a webpage, and the webpage is returned to the remote-controlling terminal. For another example, after executing a player instruction (such as play, stop, previous track, next track, etc.), the name of the music being played and the playing status (such as being played, being stopped) are used to generate a webpage, and the webpage is returned to the remote-controlling terminal.

In accordance with this embodiment, user operation on the remote-controlling terminal can be reflected on the remote-controlling terminal, and remote-controlled terminal can return the current execution result to the remote-controlling terminal, which enhances interactivity.

In accordance with a preferred embodiment of the present invention, the remote control information can further include a URL to increase usability and scalability, and executing a control instruction in accordance with the remote control information and returning execution result to the remote-controlling terminal in a webpage format further comprises:

If the webpage corresponding to the URL in the control information is a control page, the control instruction at the control page is executed, and the execution result is returned to the remote-controlling terminal in a webpage format; or If the webpage corresponding to the URL in the remote control information is a main page, information on the main page is returned to the remote-controlling terminal, a link to a control page selected by a user at the remote-controlling terminal is returned, the control instruction at the control page is executed, and the execution result is returned to the remote-controlling terminal in a webpage format, or If the webpage corresponding to the URL in the remote control information is a main page, information on the main page is returned to the remote-controlling terminal; a control instruction entered in the control instruction input box by a user at the remote-controlling terminal is received, a corresponding control page is generated based on the control instruction, the control instruction is executed, and the execution result is returned to the remote-controlling terminal in a webpage format.

It should be further noted that, in accordance with this embodiment, the control pages are independent of each other, and the web server can add, delete or modify the control pages based on need.

Embodiment Three

Figure 3:
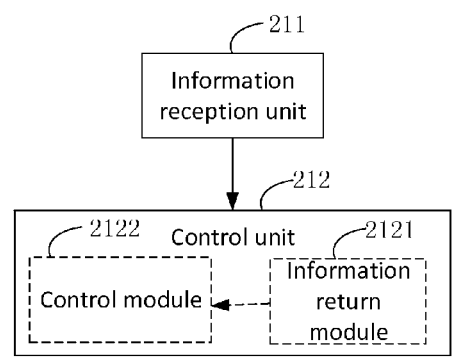
FIG. 3 is an exemplary schematic diagram for a web server for remote control in accordance with a third embodiment of the present invention.

FIG. 3 is an exemplary schematic diagram for a web server for remote control in accordance with a third embodiment of the present invention. For illustrative purposes, only the components relevant to this embodiment are shown.

The web server can be a software module running in the remote-controlled terminal, a hardware module, or a software/hardware combined module. The web server can also be a separate plug-in integrated into the remote-controlled terminal or running under the operation system of the remote-controlled terminal.

The web server includes an information reception unit 211 and a control unit 212. The functions of these units are as following:

The information reception unit 211 is used for receiving remote control information sent by a remote-controlling terminal.

The control unit 212 is used for executing a control instruction on a corresponding webpage in accordance with the remote control information, or sending information on the corresponding webpage back to the remote-controlling terminal and executing a control instruction selected or entered by a user at the remote-controlling terminal based on information on the corresponding webpage; and returning execution result to the remote-controlling terminal in a webpage format.

Preferably, the remote control information includes a Universal Resource Locator (URL).

The control unit 212 is further used for, if the webpage corresponding to the URL is a control page, executing a control instruction at the control page, and returning the execution result to the remote-controlling terminal in a webpage format.

Alternative, the control unit 212 includes an information return module 2121 for, if the webpage corresponding to the URL is a main page comprising links to a plurality of control pages, returning information on the main page to the remote-controlling terminal; and a control module 2122 for receiving a link to a control page selected by a user at the remote-controlling terminal, executing a control instruction at the control page, and returning the execution result to the remote-controlling terminal in a webpage format.

Alternatively, the control unit 212 includes an information return module 2121 for, if the webpage corresponding to the URL is a main page comprising a control instruction input box, returning information on the main page to the remote-controlling terminal; and a control module 2122 for receiving a control instruction entered in the control instruction input box by a user at the remote-controlling terminal through, generating a corresponding control page based on the control instruction, executing the control instruction, and returning the execution result to the remote-controlling terminal in a webpage format.

In accordance with this embodiment, the control instruction includes but is not limited to PPT Page Up, PPT Page Down, Monitor On, Monitor Off, Player Volume Control, or Player Playing a designated file.

The web server in accordance with this embodiment can be used to implement the method for remote control in reference to Embodiment Two described above.

Those skilled in the art will understand that the various units and modules in Embodiment Three are allocated based on its functions, and that the present invention is not limited to the above allocation as far as the various functions can be implemented. Furthermore, the specific names of the various units and modules are provided merely to differentiate them from each other, and do not intent to limit the scope of the present invention.

As discussed above, in accordance with this embodiment, the remote-controlling terminal can remotely control the remote-controlled terminal by visiting the web server, i.e., the remote-controlling terminal interacts with the remote-controlled terminal through webpages, and controls the remote-controlled terminal through the execution of control instruction on webpages Unlike the prior art, in accordance with this embodiment, user operation on the remote-controlling terminal can be reflected on the remote-controlling terminal, and remote-controlled terminal can return the current execution result to the remote-controlling terminal. Furthermore, no remote control software needs to be separately installed on the remote-controlling terminal and the remote-controlled terminal in accordance with this embodiment, thus avoiding the issue of poor usability caused by the platform diversity of intelligent devices and the need to develop different remote control software for different platforms. Furthermore, the remote-controlling terminal can select or enter corresponding control instruction based on the needs during the interactive remote control operation, which enhances interactivity and scalability, and avoids poor scalability in existing custom-made remote controlling terminals (such as PPT remote control pen) that can only implement manufacturer-configured remote control functions (for example, PPT remote control pan can only implement the functions of PPT Page Up or PPT Page Down).

Those skilled in the art will understand that all or part of the steps in embodiments of the present invention can be implemented by a computer program controlling the relevant hardware. The computer program can be stored in a computer readable storage media, which can be ROM/RAM, magnetic disk or optical disk, etc.

The various embodiments of the present invention are merely preferred embodiments, and are not intended to limit the scope of the present invention. Those skilled in the art can make various modifications, equivalents, or improvements without departing from the spirit and principles of the present invention, and those modifications, equivalent, or improvements should be considered to be within the scope of the present invention, which is solely defined by the claims.

The invention claimed is:

1. A method for remote control, the method comprising:
   receiving remote control information sent by a remote-controlling terminal;
   executing a control instruction on a corresponding webpage in accordance with the remote control information, or sending information on the corresponding webpage back to the remote-controlling terminal and executing a control instruction selected or entered by a user at the remote-controlling terminal based on information on the corresponding webpage;
   generating an execution result webpage using a result of executing the control instruction; and
   returning the execution result webpage to the remote-controlling terminal.

2. The method of claim 1, wherein the remote control information comprises a Universal Resource Locator (URL).

3. The method of claim 2, wherein executing a control instruction on a corresponding webpage in accordance with the remote control information comprises:
   if the webpage corresponding to the URL is a control page, executing a control instruction at the control page.

4. The method of claim 2, wherein sending information on the corresponding webpage back to the remote-controlling terminal and executing a control instruction selected by a user at the remote-controlling terminal based on information on the corresponding webpage comprises:
   if the webpage corresponding to the URL is a main page comprising links to a plurality of control pages, returning information on the main page to the remote-controlling terminal; and
   receiving a link to a control page selected by a user at the remote-controlling terminal, and executing a control instruction at the control page.

5. The method of claim 2, wherein sending information on the corresponding webpage back to the remote-controlling terminal and executing a control instruction entered by a user at the remote-controlling terminal based on information on the corresponding webpage comprises:
   if the webpage corresponding to the URL is a main page comprising a control instruction input box, returning information on the main page to the remote-controlling terminal; and
   receiving a control instruction entered in the control instruction input box by a user at the remote-controlling terminal, generating a corresponding control page based on the control instruction, and executing the control instruction.

6. The method of claim 1, wherein the control instruction is selected from a group comprising PPT Page Up, PPT Page Down, Monitor On, Monitor Off, Player Volume Control, and Player Playing a designated file.

7. A web server, comprising:
   an information reception unit for receiving remote control information sent by a remote-controlling terminal;
   a control unit for:
      executing a control instruction on a corresponding webpage in accordance with the remote control information, or sending information on the corresponding webpage back to the remote-controlling terminal and executing a control instruction selected or entered by a user at the remote-controlling terminal based on information on the corresponding webpage;

generating an execution result webpage using a result of executing the control instruction; and returning the execution result webpage to the remote-controlling terminal.

8. The web server of claim 7, wherein the remote control information comprises a Universal Resource Locator (URL).

9. The web server of claim 8, wherein the control unit is configured for, if the webpage corresponding to the URL is a control page, executing a control instruction at the control page.

10. The web server of claim 8, wherein the control unit further comprises:

an information return module for, if the webpage corresponding to the URL is a main page comprising links to a plurality of control pages, returning information on the main page to the remote-controlling terminal; and a control module for receiving a link to a control page selected by a user at the remote-controlling terminal, and executing a control instruction at the control page.

11. The web server of claim 8, wherein the control unit further comprises:

an information return module for, if the webpage corresponding to the URL is a main page comprising a control instruction input box, returning information on the main page to the remote-controlling terminal; and a control module for receiving a control instruction entered in the control instruction input box by a user at the remote-controlling terminal, generating a corresponding control page based on the control instruction, and executing the control instruction.

12. The web server of claim 7, wherein the control instruction is selected from a group comprising PPT Page Up, PPT Page Down, Monitor On, Monitor Off, Player Volume Control, and Player Playing a designated file.

13. A system for remote control, comprising a remote-controlling terminal and a remote-controlled terminal, wherein the remote-controlling terminal is connected to the remote-controlled terminal through a network, the remote-controlled terminal comprises a web server of claim 7, and remote-controlled terminal is configured to receive remote control information sent by a remote-controlling terminal through the web server and be remotely controlled through the remote control information.

14. A web server, comprising a receiving unit for receiving a URL corresponding to a control page from a remote-controlling terminal;

a control unit for:

causing the execution of a control instruction on the control page, and generating an execution result webpage using a result of executing the control instruction; and a feedback unit for sending the execution result webpage to the remote-controlling terminal.

15. The web server of claim 14, wherein if the receiving unit receives a URL corresponding to a main page from a remote-controlling terminal, the feedback unit is configured to send the content of the main page to the remote-controlling terminal in a webpage format.

16. The web server of claim 15, wherein the main page comprising links to a plurality of control pages.

17. The web server of claim 15, wherein the main page comprising a control instruction input box.

18. The web server of claim 14, wherein the remote-controlling terminal is a smartphone.

19. The web server of claim 14, where the control unit is configured to cause the execution of the control instruction on the control page on a computer.

20. The web server of claim 14, wherein the control instruction is selected from a group comprising PPT Page Up, PPT Page Down, Monitor On, Monitor Off, Player Volume Control, and Player Playing a designated file.

* * * * *